US012567576B2

(12) United States Patent
Kim et al.

(10) Patent No.: US 12,567,576 B2
(45) Date of Patent: Mar. 3, 2026

(54) METHOD OF PREPARING NEGATIVE ELECTRODE

(71) Applicant: LG ENERGY SOLUTION, LTD., Seoul (KR)

(72) Inventors: Hyun Chul Kim, Daejeon (KR); Oh Byong Chae, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 457 days.

(21) Appl. No.: 18/022,781

(22) PCT Filed: Oct. 25, 2021

(86) PCT No.: PCT/KR2021/015050
§ 371 (c)(1),
(2) Date: Feb. 23, 2023

(87) PCT Pub. No.: WO2022/092740
PCT Pub. Date: May 5, 2022

(65) Prior Publication Data
US 2023/0317917 A1 Oct. 5, 2023

(30) Foreign Application Priority Data
Oct. 26, 2020 (KR) ........................ 10-2020-0139477

(51) Int. Cl.
| | |
|---|---|
| *H01M 4/04* | (2006.01) |
| *H01M 4/02* | (2006.01) |
| *H01M 4/1393* | (2010.01) |
| *H01M 4/587* | (2010.01) |
| *H01M 10/44* | (2006.01) |

(52) U.S. Cl.
CPC ....... *H01M 4/0452* (2013.01); *H01M 4/1393* (2013.01); *H01M 4/587* (2013.01); *H01M 10/446* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,432,029 A | 7/1995 | Mitate et al. | |
| 5,478,364 A | 12/1995 | Mitate et al. | |
| 10,446,333 B2 | 10/2019 | Zhamu et al. | |
| 2012/0288766 A1* | 11/2012 | Lee | H01M 4/38 |
| | | | 977/773 |

| | | | |
|---|---|---|---|
| 2013/0309577 A1* | 11/2013 | Hayashi | H01G 11/24 |
| | | | 977/948 |
| 2017/0301910 A1 | 10/2017 | Wang et al. | |
| 2019/0051466 A1 | 2/2019 | Zhamu et al. | |
| 2020/0259164 A1 | 8/2020 | Wang et al. | |
| 2020/0395593 A1* | 12/2020 | Zhu | H01M 4/587 |
| 2021/0257602 A1 | 8/2021 | Chae et al. | |
| 2021/0384485 A1 | 12/2021 | Chae et al. | |
| 2022/0006065 A1 | 1/2022 | Chae et al. | |
| 2022/0020538 A1* | 1/2022 | Otani | H01M 4/0459 |
| 2022/0020976 A1 | 1/2022 | Chae et al. | |

FOREIGN PATENT DOCUMENTS

| | | |
|---|---|---|
| CN | 1343017 A | 4/2002 |
| CN | 102779990 A | 11/2012 |
| CN | 108321438 A | 7/2018 |
| CN | 111146423 A | 5/2020 |
| JP | 6-275271 A | 9/1994 |
| JP | 6-325753 A | 11/1994 |
| JP | 7-235330 A | 9/1995 |
| JP | 8-273666 A | 10/1996 |
| JP | 2000-53408 A | 2/2000 |
| JP | 2000-203817 A | 7/2000 |
| JP | 3188853 B2 | 7/2001 |
| KR | 10-0291067 B1 | 6/2001 |
| KR | 10-1098376 B1 | 12/2011 |
| KR | 10-1173673 B1 | 8/2012 |
| KR | 10-1215555 B1 | 12/2012 |
| KR | 10-2017-0061677 A | 6/2017 |
| KR | 10-2020-0040489 A | 4/2020 |
| KR | 10-2020-0046944 A | 5/2020 |
| KR | 10-2020-0092643 A | 8/2020 |
| KR | 10-2020-0095713 A | 8/2020 |
| KR | 10-1182433 B1 | 12/2025 |

OTHER PUBLICATIONS

Extended European Search Report for European Application No. 21886734.9, dated Aug. 7, 2024.
Hou et al., "Rapid Preparation of Expanded Graphite at Low Temperature," New Carbon Materials, Elsevier, vol. 35, No. 3, May 3, 2020, XP086237763, pp. 262-268.
International Search Report (PCT/ISA/210) issued in PCT/KR2021/015050, dated Feb. 3, 2022.

\* cited by examiner

*Primary Examiner* — Louis J Rufo
(74) *Attorney, Agent, or Firm* — Birch, Stewart, Kolasch & Birch, LLP

(57) ABSTRACT

A method of preparing a negative electrode which includes preparing a negative electrode structure including expanded natural graphite, impregnating the negative electrode structure with a pre-lithiation solution to form an impregnated negative electrode structure, and pre-lithiating the impregnated negative electrode structure by electrochemically charging the impregnated negative electrode structure to 10% to 20% of charge capacity of the negative electrode structure.

11 Claims, No Drawings

METHOD OF PREPARING NEGATIVE ELECTRODE

CROSS-REFERENCE TO RELATED APPLICATIONS

This application claims priority from Korean Patent Application No. 10-2020-0139477, filed on Oct. 26, 2020, the disclosure of which is incorporated, by reference herein.

TECHNICAL FIELD

The present invention relates to a method of preparing a negative electrode.

BACKGROUND ART

Recently, with the rapid spread of electronic devices using batteries, such as mobile phones, notebook computer, and elect vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

The lithium secondary battery generally includes a positive, electrode, a negative electrode, a separator disposed between the positive electrode and the negative electrode, an electrolyte, and an organic solvent. Also, with respect to the positive electrode and the negative electrode, an active material layer including a positive electrode active material or a negative electrode active material may be formed on a current collector. A lithium-containing metal oxide, such as $LiCoO_2$ and $LiMn_2O_4$, is generally used as the positive electrode active material in the positive electrode, and, accordingly, a carbon-based active material or silicon-based active material containing no lithium is used as the negative electrode active material in the negative electrode.

Natural graphite, expanded natural graphite, or artificial graphite is known as the carbon-based active material among the negative electrode active materials. Among them, the expanded natural graphite is a kind of carbon-based active material in which a spacing between crystal lattice planes in natural graphite is increased through an artificial treatment such as a treatment of natural graphite with an acid or a base. Since the expanded natural graphite has a large spacing between the crystal lattice planes to facilitate intercalation and deintercalation of lithium ions, it is advantageous in that output characteristics may be maximized. However, since the large spacing between the crystal lattice planes causes an increase in specific surface area and an increase in irreversible capacity, there is a limitation in that initial efficiency is very low and life characteristics are poor.

Thus, there is an urgent need to develop a method of preparing a negative electrode which may improve the initial efficiency and life characteristics while exhibiting the output characteristics of the expanded natural graphite at an excellent level in the negative electrode using the expanded natural graphite.

Korean Patent No. 10-0291067 discloses a method of pre-lithiating a carbon electrode and a method of preparing a lithium secondary battery using the same.

Prior Art Document

Patent Document

Korea Patent No. 10-0291067

DISCLOSURE OF THE INVENTION

Technical Problem

An aspect of the present invention provides a method of preparing a negative electrode which may improve initial efficiency and life characteristics while exhibiting output characteristics of expanded natural graphite at the same time by pre-lithiating a negative electrode structure including the expanded natural graphite by electrochemically charging the negative electrode structure with a specific charge amount.

Technical Solution

According to an aspect of the present invention, there is provided a method of preparing a negative electrode which includes: preparing a negative electrode structure including expanded natural graphite; impregnating the negative electrode structure with a pre-lithiation solution to form an impregnated negative electrode structure; and pre-lithiating the impregnated negative electrode structure by electrochemically charging the impregnated negative electrode structure to 10% to 20% of a charge capacity of the negative electrode structure.

ADVANTAGEOUS EFFECTS

According to a method of preparing a negative electrode of the present invention, the method is characterized in that, after a negative electrode structure including expanded natural graphite is impregnated with a pre-lithiation solution, the impregnated negative electrode structure is electrochemically charged with a specific charge amount. The negative electrode prepared through pre-lithiation by being electrochemically charged with the above charge amount may exhibit excellent output characteristics, initial efficiency, and life characteristics. Particularly, the expanded natural graphite is generally known to have lower initial efficiency and poorer life characteristics than general natural graphite, but, since irreversible capacity of the expanded natural graphite-containing negative electrode electrochemically charged with the above charge amount is compensated to a desirable level, the initial efficiency may be improved, and low diffusion resistance due to a large spacing between crystal lattice planes of the expanded natural graphite may improve the life characteristics to be significantly better than those of the general natural graphite.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include", "comprise", or "have" when used in this specification, specify the presence of stated features, numbers, steps, elements, combinations thereof, but do not preclude the presence or addition of one or more other features, numbers, steps, elements, or combinations thereof.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

Hereinafter, the present invention will be described in detail.

<Method of Preparing Negative Electrode>

The present invention relates to a method of preparing a negative electrode, and particularly, to a method of preparing a negative electrode for a lithium secondary battery.

The method of preparing a negative electrode of the present invention includes the steps of: preparing a negative electrode structure including expanded natural graphite; impregnating the negative electrode structure with a pre-lithiation solution; and pre-lithiating the impregnated negative electrode structure by electrochemically charging the impregnated negative electrode structure to 10% to 20% of a charge capacity of the negative electrode structure.

According to the method of preparing a negative electrode of the present invention, the method is characterized in that, after a negative electrode structure including expanded natural graphite is impregnated with a pre-lithiation solution, the impregnated negative electrode structure is electrochemically charged with a specific charge amount. The negative electrode prepared through pre-lithiation by being electrochemically charged with the above charge amount may exhibit excellent output characteristics, initial efficiency, and life characteristics. Particularly, the expanded natural graphite is generally known to have lower initial efficiency and poorer life characteristics than general natural graphite, but, since irreversible capacity of the expanded natural graphite-containing negative electrode electrochemically charged with the above charge amount is compensated to a desirable level, the initial efficiency may be improved, and low lithium ion diffusion resistance due to a large spacing between crystal lattice planes of the expanded natural graphite, may improve the life characteristics to be significantly better than those of the general natural graphite.

The method of preparing a negative electrode of the present invention includes preparing a negative electrode structure including expanded natural graphite.

The expanded natural graphite may be included as a negative electrode active material in the negative electrode structure.

The expanded natural graphite may generally be one in which an acid or base, which is treated into natural graphite, and a carbon atom are chemically bonded and then thermally decomposed to increase a spacing between crystal lattice planes of the natural graphite. In general, since the expanded natural graphite has a larger spacing between the crystal lattice planes than the general natural graphite, it has better output characteristics than the general natural graphite, but is disadvantageous in that it has large irreversible capacity and has low initial efficiency and life characteristics due to an increase in electrolyte solution side reaction caused by a large specific surface area. However, with respect to the expanded natural graphite subjected to pre-lithiation by being electrochemically charged with a specific charge amount as will be described later, since its irreversible capacity is sufficiently compensated while it may exhibit excellent output characteristic, it has high initial efficiency, and it may exhibit better life characteristics than the general natural graphite because lithium ion diffusion is smooth and it may have low lithium ion diffusion resistance due to the large spacing between the crystal lattice planes.

An interplanar spacing d002 of a (002) plane of the expanded natural graphite during X-ray diffraction (XRD) measurement may be in a range of 0.3370 nm to 0.3.410 nm, for example, 0.3390 nm to 0.3405 nm. Since the expanded natural graphite has the interplanar spacing d002 within the above range, entry or diffusion of lithium ions in the expanded natural graphite is easier than that in the general natural graphite having a relatively small d002, and the expanded natural graphite may have excellent output characteristics. Also, according to the method of preparing a negative electrode of the present invention, the irreversible capacity of the expanded natural graphite is compensated by a pre-lithiation process to be described later, wherein, since the expanded natural graphite having the interplanar spacing d002 in the above range has low lithium ion diffusion resistance, it may have excellent life characteristics even during repeated charge and discharge.

A crystallite size Lc of the expanded natural graphite in a c-axis direction during XRD measurement may be in a range of 10 nm to 24 nm, for example, 16 nm to 21 nm. The expanded natural graphite may have excellent output characteristics by having the crystallite size Lc within the above range.

A Brunauer-Emmett-Teller (BET) specific surface area of the expanded natural graphite may be in a range of 4 $m^2$/g to 8 $m^2$/g, for example, 4.5 $m^2$/g to 6.5 $m^2$/g. When the BET specific surface area is within the above range, the entry of the lithium ions of the expanded natural graphite facilitated, and the output characteristics may be improved. Furthermore, according to the method of preparing a negative electrode of the present invention, the irreversible capacity of the expanded natural graphite is compensated by the pre-lithiation process to be described later, wherein, since the expanded natural graphite having the specific surface area in the above range has low lithium ion diffusion resistance, it may have excellent life characteristics even during repeated charge and discharge.

An average particle diameter ($D_{50}$) of the expanded natural graphite may be in a range of 8 μm to 20 μm, for example, 12 μm to 18 μm in terms of providing structural stability of the negative electrode active material during charge and discharge.

The expanded natural graphite may include oxygen (O) in an amount of 800 ppm to 3,000 ppm, specifically 1,000 ppm to 2,800 ppm, and more specifically 1,500 ppm to 2,500 ppm based on a weight of the expanded natural graphite. Since the expanded natural graphite is subjected to an acid or base treatment in a preparation process, an oxygen-containing functional group, such as a hydroxy group (—OH), is formed on a surface, and/or inside of the expanded natural graphite, and thus, the expanded natural graphite has a higher oxygen content than the general natural graphite.

The oxygen content of the expanded natural graphite may be measured by an ONH analyzer or an X-ray photoelectron spectroscopy (XPS) analyzer.

The negative electrode structure may include a negative electrode current collector; and a negative electrode active material layer on at least one surface of the negative electrode current collector. The negative electrode active material layer may include the expanded natural graphite.

The negative electrode current collector is not particularly limited as long as it has high conductivity without causing adverse chemical changes in the battery. Specifically, the negative electrode current collector may include at least one selected from the group consisting of copper, stainless steel, aluminum, nickel, titanium, fired carbon, and an aluminum-cadmium alloy, and may preferably include copper.

The negative electrode current collector may typically have a thickness of 3 μm to 500 μm.

Microscopic irregularities may be formed on a surface of the negative electrode current collector to improve adhesion of the negative electrode active material. For example, the negative electrode current collector may be used in various shapes such as that of a film, a sheet, a foil, a net, a porous body, a foam body, a non-woven fabric body, and the like.

The negative electrode active material layer may include the above-described expanded natural graphite as a negative electrode active material.

The expanded natural graphite may be included in an amount of 85 wt % to 99 wt % for example, 90 wt % to 98 wt % in the negative electrode active material layer in terms of sufficiently exhibiting excellent output characteristics and capacity characteristics of the expanded natural graphite.

The negative electrode active material layer may further include at least one additive selected from the group consisting of a binder, a conductive agent, and a thickener in addition to the expanded natural graphite.

The binder is used to improve performance of the battery by improving adhesion between the negative electrode active material layer and the negative electrode current collector, wherein, for example, the binder may include at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethyl cellulose (CMC), starch, hydroxypropyl cellulose, polyvinylpyrrolidone, polytetrafluoroethylene, polyethylene, polypropylene, polyacrylate, an ethylene-propylene-diene monomer (EPDM), a sulfonated EPDM, a styrene-butadiene rubber (SBR), and a fluorine rubber, and may preferably include a styrene-butadiene rubber.

The binder may be included in an amount of 0.5 wt % to 10 wt %, for example, 1 wt % to 5 wt % in the negative electrode active material layer, and, when the amount of the binder is within the above range, capacity of the negative electrode may be improved by increasing a solid content of the active material while sufficient adhesion of the active material may be exhibited.

Any conductive agent may be used without particular limitation so long as it has conductivity without causing adverse chemical changes in the battery, and, for example, a conductive material, such as: graphite such as natural graphite or artificial graphite; carbon black such as carbon black, acetylene black, Ketjen black, channel black, furnace black, lamp black, and thermal black; conductive fibers such as carbon fibers or metal fibers; conductive tubes such as carbon nanotubes; fluorocarbon; metal powder such as aluminum powder, and nickel powder; conductive whiskers such as zinc oxide whiskers and potassium titanate whiskers; conductive metal oxide such as titanium oxide; or polyphenylene derivatives, may be used.

The conductive agent may be included in an amount of 0.5 wt % to 10 wt %, for example, 1 wt % to 5 wt % in the negative electrode active material layer in order to exhibit sufficient conductivity.

The thickener is added for smooth dispersion of the expanded natural graphite during the preparation of a negative electrode slurry for the formation of the negative electrode active material layer, wherein the thickener, for example, may include carboxymethyl cellulose (CMC). The thickener may be included in an amount of 0.1 wt % to 5 wt % in the negative electrode active material.

A thickness of the negative electrode active material layer may be in a range of 10 μm to 100 μm, for example, 20 μm to 80 μm.

The negative electrode may be prepared by coating the negative electrode current collector with the negative electrode slurry which is prepared by adding the expanded natural graphite as well as optionally the binder and/or the conductive agent to a solvent for forming a negative electrode slurry (e.g., water), and then roll-pressing and drying the coated negative electrode current collector.

The method of preparing a negative electrode of present invention includes impregnating the negative electrode structure with a pre-lithiation solution.

The impregnation of the negative electrode structure is performed so that smooth pre-lithiation is performed during electrochemical charging to be described later by sufficiently wetting the negative electrode structure in the pre-lithiation solution.

The pre-lithiation solution may include a lithium salt and an organic solvent.

The organic solvent is not particularly limited so long as it may function as a medium for an electrochemical reaction and the movement of ions and specifically, an ester-based solvent such as methyl acetate ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used. Among these solvents, the carbonate-based solvent is desirable in terms improving electrochemical stability, and, specifically, ethylmethyl carbonate (EMC) or ethylene carbonate (EC) is more desirable.

The lithium salt may include at least one selected from the group consisting of $LiPF_6$, $LiClO_4$, $LiAsF_6$, $LiBF_4$, $LiShF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, and $LiB(C_2O_4)_2$, and may preferably include $LiPF_6$.

A concentration of the lithium salt may be in a range of 0.1 M to 3 M, for example, 0.5 M to 1.5 M based on the pre-lithiation solution. When the concentration of the lithium salt is within the above range, it is desirable because the lithium salt may be sufficiently dissolved so that lithium ions may be smoothly intercalated into the active material.

The pre-lithiation solution may further include an additive including at least one selected from the group consisting of fluoroethylene carbonate (FEC), vinylene carbonate (VC), polystyrene (PS), succinonitrile, ethylene glycol bis(propionitrile) ether, and lithium bis(fluorosulfonyl)imide (LiFSI), preferably, fluoroethylene carbonate, in terms of facilitating pre-lithiation by stabilizing a surface of the negative electrode active material during the pre-lithiation.

The additive may be included in the pre-lithiation solution in an amount of 0.1 wt % to 15 wt %, for example, 0.5 wt % to 5 wt % based on a total weight of the pre-lithiation solution in terms of facilitating the pre-lithiation by stabilizing the surface of the negative electrode active material.

The impregnation of the negative electrode structure may be performed for 0.5 hours to 15 hours, for example, 1 hour to 5 hours in terms of ensuring stable and uniform pre-lithiation.

The method of preparing a negative electrode of the present invention includes pre-lithiating the impregnated negative electrode structure by electrochemically charging the impregnated negative electrode structure to 10% to 20% of a charge capacity of the negative electrode structure.

Lithium ions the pre-lithiation solution are intercalate into the surface and/or inside of the expanded natural graphite as the impregnated negative electrode structure is pre-lithiated, the irreversible capacity of the expanded natural graphite may be compensated, and a solid electrolyte interface layer (SEI layer) may be formed advance on the expanded natural graphite.

The pre-lithiation is performed by electrochemically charging the impregnated negative electrode structure. As a general pre-lithiation method, a method of intercalating lithium of a lithium metal into a negative electrode by directly contacting the lithium metal with the negative electrode or a method of electrochemically charging a negative electrode structure using a lithium metal as a counter electrode is known, wherein, since a charge amount during the electrochemical charging is important in order to simultaneously improve initial efficiency, output characteristics, and life characteristics of the impregnated negative electrode structure as described later, it is desirable to use the electrochemical charging method in which an amount of lithium charge may be easily controlled.

In the pre-lithiating, the impregnated negative electrode structure is electrochemically charged to 10% or 20% of the charge capacity of the negative structure. Since the irreversible capacity of the expanded natural graphite is sufficiently compensated as the negative electrode structure is electrochemically charged at the above charge ratio, the initial efficiency may be improved, high output characteristics of the expanded natural graphite are smoothly exhibited, and better life characteristics than those of the general natural graphite may be exhibited due to the low lithium ion diffusion resistance caused by the large spacing between the crystal lattice planes. Accordingly, it is possible not only to overcome disadvantages of the expanded natural graphite, which is generally known to have lower life characteristics and initial efficiency than the general natural graphite, but also to exhibit significantly improved output characteristics and life characteristics in comparison to the general natural graphite.

If, in a case in which the impregnated negative electrode structure is electrochemically charged to less than 10% of the charge capacity of the negative electrode structure, since a degree of compensation of the irreversible capacity of the expanded natural graphite is insignificant, it is difficult to improve the initial efficiency, and thus, it is difficult to improve long-term cycle characteristics. If, in a case in which the impregnated negative electrode structure is electrochemically charged to greater than 20% of the charge capacity of the negative electrode structure, since output is reduced by increasing resistance due to excessive intercalation of lithium, there is a concern that the reduction in output and the increase in resistance are accumulated to degrade the long-term cycle characteristics.

Preferably, the impregnated negative electrode structure may be electrochemically charged to 13% to 16% of the charge capacity of the negative electrode structure, and, when the impregnated negative electrode structure is electrochemically charged within the above range, an effect of simultaneously improving the initial efficiency, output characteristics, and life characteristics of the negative electrode may be maximized.

The electrochemical charging may be performed using a lithium metal as a counter electrode, wherein the lithium metal is present in the pre-lithiation solution and is spaced apart from the impregnated negative electrode structure. Since the lithium metal used as the counter electrode is disposed in the pre-lithiation solution so as to be spaced apart from the negative electrode structure, an electrode short circuit phenomenon, which may occur as the lithium metal and the negative electrode structure are directly in contact with each other during the electrochemical charging, may be prevented.

The electrochemical charging may be performed using an electrochemical charger/discharger. Specifically, WOCS3000s (manufactured by WonATech Co., Ltd.) may be used the electrochemical charger/discharger.

The electrochemical charging may be performed at a current density of 0.1 $mA/cm^2$ to 3 $mA/cm^2$, for example, at a current density of 0.3 $mA/cm^2$ to 2 $mA/cm^2$, and stable and uniform pre-lithiation may be performed on the negative electrode active material when the electrochemical charging is performed within the above range.

The electrochemical charging may be performed at 10° C. to 70° C., for example, 20° C. to 40° C., wherein the negative electrode structure is stably charged and discharged at the above temperature to be able to form a uniform SEI layer, and it is desirable in terms of preventing damage, to the negative electrode structure due to the electrochemical charging.

The pre-lithiated negative electrode structure may be used as a negative electrode for a secondary battery, more specifically, a negative electrode for a lithium secondary battery, and may have a high level of initial efficiency and life characteristics while smoothly exhibiting excellent output characteristics of the expanded natural graphite.

The negative electrode prepared by the preparation method of the present invention may be preferably used in a secondary battery, specifically, a lithium secondary battery.

The secondary battery may include the negative electrode prepared by the above-described preparation method; a positive electrode facing the negative electrode; a separator disposed between the negative electrode and the positive electrode; and an electrolyte. Those used in a conventional lithium secondary battery may be used as the positive electrode, the separator, and the electrolyte without limitation.

The secondary battery is suitable for portable devices, such as mobile phones, notebook computers, and digital cameras, and electric cars such as hybrid electric vehicles (HEVs).

Also, the secondary battery may be used in a battery module including the secondary battery as a unit cell or a battery pack including the battery module.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Example 1: Preparation of Negative Electrode

<Preparation of Negative Electrode Structure>

Expanded natural graphite (average particle diameter ($D_{50}$): 16 µm) was prepared as a negative electrode active material. An interplanar spacing d002 of a (002) plane of the expanded natural graphite during XRD measurement was 0.3402 nm, a crystallite size Lc of the expanded natural graphite in a c-axis direction during XRD measurement was 17.73 nm, a BET specific surface area was 5.4 m²/g, and an oxygen (O) content measured by an ONH analyzer (manufacturer: LECO, name: ONH 836) was 2,100 ppm based on a weight of the expanded natural graphite.

The negative electrode active material, carbon black as a conductive agent, a styrene-butadiene rubber (SBR) as a binder, and carboxymethyl cellulose, as a thickener, were added in water at a weight ratio of 95.0:1.0:1.3:1.1 to prepare a negative electrode slurry.

The negative electrode slurry was coated on one surface of a copper negative electrode current collector (thickness: 15 µm), the coated negative electrode current collector was roll pressed and dried in a vacuum oven at 130° C. for 10 hours to form a negative electrode active material layer (thickness: 111 µm) on the one surface of the copper negative electrode current collector and form a negative electrode structure having an area of 1.4875 m². In this case, a loading amount of the negative electrode active material layer was 3.61 mAh/cm².

<Impregnation of Negative Electrode Structure>

The prepared negative electrode structure was impregnated in a pre-lithiation solution for 3 hours.

One, in which $LiPF_6$, as a lithium salt, was added at a concentration of 1 M to an organic solvent, in which ethylene carbonate (EC) and ethylmethyl carbonate (EMC) were mixed in a volume ratio of 30:70, and fluoroethylene carbonate (FEC), as an additive, was, added in an amount of 2 wt % based on a total weight of the pre-lithiation solution, was used as the pre-lithiation solution.

<Pre-Lithiation Process>

A lithium metal counter electrode was immersed in the pre-lithiation solution to be spaced apart from the negative electrode structure by a predetermined distance.

Thereafter, a pre-lithiation process was performed on the negative electrode structure. The pre-lithiation process was performed at 25° C. Specifically, in the pre-lithiation process, the impregnated negative electrode structure was electrochemically charged at a current density of 0.5 mA/cm² with a charge amount of 15.7% of charge capacity of the negative electrode structure.

The negative electrode structure washed with an ethylmethyl carbonate solvent and dried at room temperature to obtain a negative electrode of Example 1.

Example 2: Preparation of Negative Electrode

A negative electrode of Example 2 was prepared in the same manner as in Example 1 except that the impregnated negative electrode structure was electrochemically charged with a charge amount of 17.5% of the charge capacity of the negative electrode structure.

Example 3: Preparation of Negative Electrode

A negative electrode of Example 3 was prepared in the same manner as in Example 1 except that the impregnated negative electrode structure was electrochemically charged with a charge amount of 11.4% of the charge capacity of the negative electrode structure.

Comparative Example 1: Preparation Negative Electrode

The negative electrode structure, in which the impregnation and pre-lithiation process were not performed Example 1, as used as the negative e of Comparative Example 1.

Comparative Example 2: Preparation of Negative Electrode

A negative electrode of Comparative Example 2 was prepared in the same manner as in Example 1 except that general natural graphite ($D_{50}$: 16 µm), instead of the expanded natural graphite, was used as a negative electrode active material and impregnation and pre-lithiation process were not performed on negative electrode structure.

An interplanar spacing d002 of a (002) plane of the general natural graphite during XRD measurement was 0.3355 nm, a crystallite size to of the general natural graphite in a c-axis direction during XRD measurement was 27.57 nm, a BET specific surface area was 2.3 m²/g, and an oxygen (O) content measured by an ONE analyzer (manufacturer: LECO, name: ONE 836) was 300 ppm based on a weight of the general natural graphite.

Comparative Example 3: Preparation of Negative Electrode

A negative electrode of Comparative Example 3 was prepared in the same manner as in Example 1 except that the general natural graphite used in Comparative Example 2 was used as a negative electrode active material and the impregnated negative electrode structure was electrochemically charged with a charge amount of 9.3% of the charge capacity of the negative electrode structure.

Comparative Example 4: Preparation of Negative Electrode

A negative electrode of Comparative Example 4 was prepared in the same manner as in Example 1 except that the general natural graphite used in Comparative Example 2 was used as a negative electrode active material and the impregnated negative electrode structure was electrochemically charged with a charge amount of 15.7% of the charge capacity of the negative electrode structure.

Comparative Example 5: Preparation of Negative Electrode

A negative electrode of Comparative Example 5 was prepared in the same manner as in Example 1 except that the impregnated negative electrode structure was electrochemically charged with a charge amount of 24.2% of the charge capacity of the negative electrode structure.

Comparative Example 6: Preparation of Negative Electrode

A negative electrode of Comparative Example 6 was prepared in the same manner as in Example 1 except that the impregnated negative electrode s structure was electrochemically charged with a charge amount of 8.9% of the charge capacity of the negative electrode structure.

EXPERIMENTAL EXAMPLES

Experimental Example 1: Initial Efficiency Evaluation

<Preparation of Lithium Secondary Battery>

A lithium metal was prepared as a positive electrode.

A propylene polymer separator was disposed between the negative electrode prepared in Example 1 and the above-prepared positive electrode, and an electrolyte was injected to prepare a coin-type lithium secondary battery. One, in which $LiPF_6$, as a lithium salt, was added at a concentration of 1 M to an organic solvent, in which ethylene carbonate (EC) and ethylmethyl carbonate (EMC) were mixed in a volume ratio of 30:70, and fluoroethylene carbonate (FEC), as an additive, was added in an amount of 0.5 wt % based on the total weight of the pre-lithiation solution, was used as the electrolyte.

Coin-type lithium secondary batteries were prepared in the same manner as in Example 1 except that the negative electrodes prepared in Examples 2 and 3 and Comparative Examples 1 to 6 were used.

<Initial Efficiency Evaluation>

Charge capacity and discharge capacity of the coin-type half-cells of the examples and the comparative examples prepared above were measured, initial efficiency was calculated by the following equation, and the results thereof are presented in Table 1. Charging and discharging conditions are as follows.

Charging conditions: CCCV (constant current constant voltage) mode, 0.1 C charge, 5 mV and 0.005 C cut-off Discharging conditions: CC mode, 0.1 C discharge, 1.5 V cut-off $$Initial\ efficiency=(discharge\ capacity/charge\ capacity\ in\ 1^{st}\ cycle)\times100$$

Experimental Example 2: Output Characteristics Evaluation

<Preparation of Lithium Secondary Battery>

An aluminum current collector was coated with a positive electrode slurry, in which $LiCoO_2$ as a positive electrode active material, Super C as a conductive agent, and PVdF, as a binder, were mixed in a weight ratio of 96:1:3, roll-pressed, and dried at 130° C. to prepare a positive electrode.

A propylene polymer separator was disposed between the negative electrode prepared in Example 1 and the above-prepared positive electrode, and an electrolyte was injected to prepare a coin-type lithium secondary battery. One, in which $LiPF_6$, as a lithium salt, was added at a concentration of 1 M to an organic solvent, in which ethylene carbonate (EC) and ethylmethyl carbonate (EMC) were mixed in a volume ratio of 30:70, and fluoroethylene carbonate (FEC), as an additive, was added in an amount of 0.5 wt % based on the total weight of the pre-lithiation solution, was used as the electrolyte.

Coin-type lithium secondary batteries were prepared in the same manner as in Example 1 except that the negative electrodes prepared in Examples 2 and 3 and Comparative Examples 1 to 6 were used.

<Output Characteristics Evaluation>

The lithium secondary batteries of Examples 1 to 3 and Comparative Examples 1 to 6 were cycle charged and discharged at a high current to measure a capacity retention a $100^{th}$ cycle, and output characteristics were evaluated.

Specifically, the lithium secondary batteries of Examples 1 to 3 and Comparative Examples 1 to 6 were charged and discharged up to the $100^{th}$ cycle under charging (CC/CV mode, 5 C charge, 4.2 V, 0.005 C cut-off) and discharging (CC mode, 5 C discharge, 3.0 V cut-off) conditions.

The 100 cycle capacity retention was evaluated by the following equation, and the results thereof are presented in Table 1.

$$Capacity\ retention\ (\%)=\{(discharge\ capacity\ in\ the\ 100^{th}\ cycle)/(discharge\ capacity\ in\ a\ 1^{st}\ cycle)\}\times100$$

Experimental Example 3: Cycle Capacity Retention Evaluation

<Preparation of Lithium Secondary Battery>

Lithium secondary batteries of Examples 1 to 3 and Comparative Examples 1 to 6 were prepared in the same manner as the lithium secondary batteries of Examples 1 to 3 and Comparative Examples 1 to 6 prepared in Experimental Example 2.

<Cycle Capacity Retention Evaluation>

A cycle capacity retention was evaluated for the lithium secondary batteries of Examples 1 to 3 and Comparative Examples 1 to 6.

Specifically, the lithium secondary batteries of Examples 1 to 3 and Comparative Examples 1 to 6 were charged and discharged up to a $400^{th}$ cycle at 45° C. under charging (CC/CV mode, 1 C charge, 4.2 V, 0.005 C cut-off) and discharging (CC mode, 1 C discharge, 3.0 V cut-off) conditions.

The 400 cycle capacity retention was evaluated by the following equation, and the results thereof are presented in Table 1.

$$Capacity\ retention\ (\%)=\{(discharge\ capacity\ in\ the\ 400^{th}\ cycle)/(discharge\ capacity\ in\ the\ 1^{st}\ cycle)\}\times100$$

TABLE 1

| | Experimental Example 1 Initial efficiency (%) | Experimental Example 2 Capacity retention (5 C, $100^{th}$) | Experimental Example 3 Capacity retention (45° C., 1 C, $400^{th}$) |
|---|---|---|---|
| Example 1 | 99.8 | 97 | 94 |
| Example 2 | 102.0 | 95 | 94 |
| Example 3 | 95.0 | 97 | 94 |
| Comparative Example 1 | 84.1 | 97 | 85 |
| Comparative Example 2 | 93.0 | 67 | 90 |
| Comparative Example 3 | 98.0 | 61 | 91 |
| Comparative Example 4 | 108.7 | 53 | 89 |

TABLE 1-continued

| | Experimental Example 1 Initial efficiency (%) | Experimental Example 2 Capacity retention (5 C, 100th) | Experimental Example 3 Capacity retention (45° C., 1 C, 400th) |
|---|---|---|---|
| Comparative Example 5 | 111.0 | 82 | 92 |
| Comparative Example 6 | 90 | 97 | 90 |

Referring to Table 1, it may be confirmed that the secondary batteries of Examples 1 to 3, which were pre-lithiated by electrochemically charging the expanded natural graphite with a desired charge amount, had excellent initial efficiency, output characteristics, and life performance.

However, it may be confirmed that the secondary battery of Comparative Example 1, in which pre-lithiation was not performed on the expanded natural graphite, exhibited significantly low initial efficiency and life performance.

Also, the secondary battery of Comparative, Example 2, in which pre-lithiation was not performed on the general natural graphite, not only exhibited relatively lower output characteristics than the examples, but also exhibited degradation in life performance.

Furthermore, the secondary batteries of Comparative Examples 3 and 4, in which pre-lithiation was performed on the general natural graphite, may have somewhat improved initial efficiency, but had significantly degraded output characteristics and high lithium ion diffusion resistance. Such a degradation in output characteristics resulted in a degradation in life characteristics due to repeated charge and discharge, and it may be confirmed that Comparative Examples 3 and 4 had degraded life characteristics in comparison to Examples 1 to 3 using the expanded natural graphite.

Also, with respect to Comparative Example 5 which was pre-lithiated by electrochemically charging the expanded natural graphite with a very high charge amount, it may be confirmed that, since excessive lithium charging acted as resistance, output characteristics were significantly degraded and life performance was degraded due to the degradation of the output characteristics. With respect to Comparative Example 6 which was pre-lithiated by electrochemically charging the expanded natural graphite with a very low charge amount, since the irreversible capacity of the expanded natural graphite was not sufficiently removed, it may be confirmed that initial efficiency was significantly reduced, and life performance was significantly degraded due to the insufficient removal of the irreversible capacity.

Thus, it may be confirmed that the expanded natural graphite prepared by the preparation method of the present invention may exhibit excellent output characteristics while having high initial efficiency due to sufficient compensation of the irreversible capacity and may exhibit better life characteristics than the general natural graphite because lithium ion diffusion was smooth due to the large spacing between the crystal lattice planes.

The invention claimed is:

1. A method of preparing a negative electrode, the method comprising:

preparing a negative electrode structure comprising expanded natural graphite;

impregnating the negative electrode structure with a pre-lithiation solution to form an impregnated negative electrode structure;

pre-lithiating the impregnated negative electrode structure by electrochemically charging the impregnated negative electrode structure to 10% to 20% of a charge capacity of the negative electrode structure, wherein the expanded natural graphite comprises oxygen in an amount ranging from 800 ppm to 3,000 ppm based on a weight of the expanded natural graphite.

2. The method of claim 1, wherein, in the pre-lithiating, the impregnated negative electrode structure is electrochemically charged to 13% to 16% of the charge capacity of the negative electrode structure.

3. The method of claim 1, wherein the electrochemical charging is performed using a lithium metal as a counter electrode, wherein the lithium metal is present in the pre-lithiation solution and is spaced apart from the impregnated negative electrode structure.

4. The method of claim 1, wherein the impregnation is performed for 0.5 hours to 15 hours.

5. The method of claim 1, wherein the pre-lithiation solution comprises a lithium salt and an organic solvent.

6. The method of claim 1, wherein the electrochemical charging is performed at a current density of 0.1 mA/cm$^2$ to 3 mA/cm$^2$.

7. The method of claim 1, wherein an interplanar spacing d002 of a (002) plane of the expanded natural graphite during X-ray diffraction (XRD) measurement is in a range of 0.3370 nm to 0.3410 nm.

8. The method of claim 1, wherein a Brunauer-Emmett-Teller (BET) specific surface area of the expanded natural graphite is in a range of 4 m$^2$/g to 8 m$^2$/g.

9. The method of claim 1, wherein a crystallite size Lc of the expanded natural graphite in a c-axis direction during XRD measurement is in a range of 10 nm to 24 nm.

10. The method of claim 1, wherein an average particle diameter ($D_{50}$) of the expanded natural graphite is in a range of 8 μm to 20 μm.

11. The method of claim 1, wherein the negative electrode structure comprises:

a negative electrode current collector; and a negative electrode active material layer on at least one surface of the negative electrode current collector, wherein the negative electrode active material layer comprises the expanded natural graphite.

* * * * *